Nov. 11, 1941.　　　　G. P. MARCY　　　　2,262,027
REFRIGERATION APPARATUS
Filed June 6, 1939
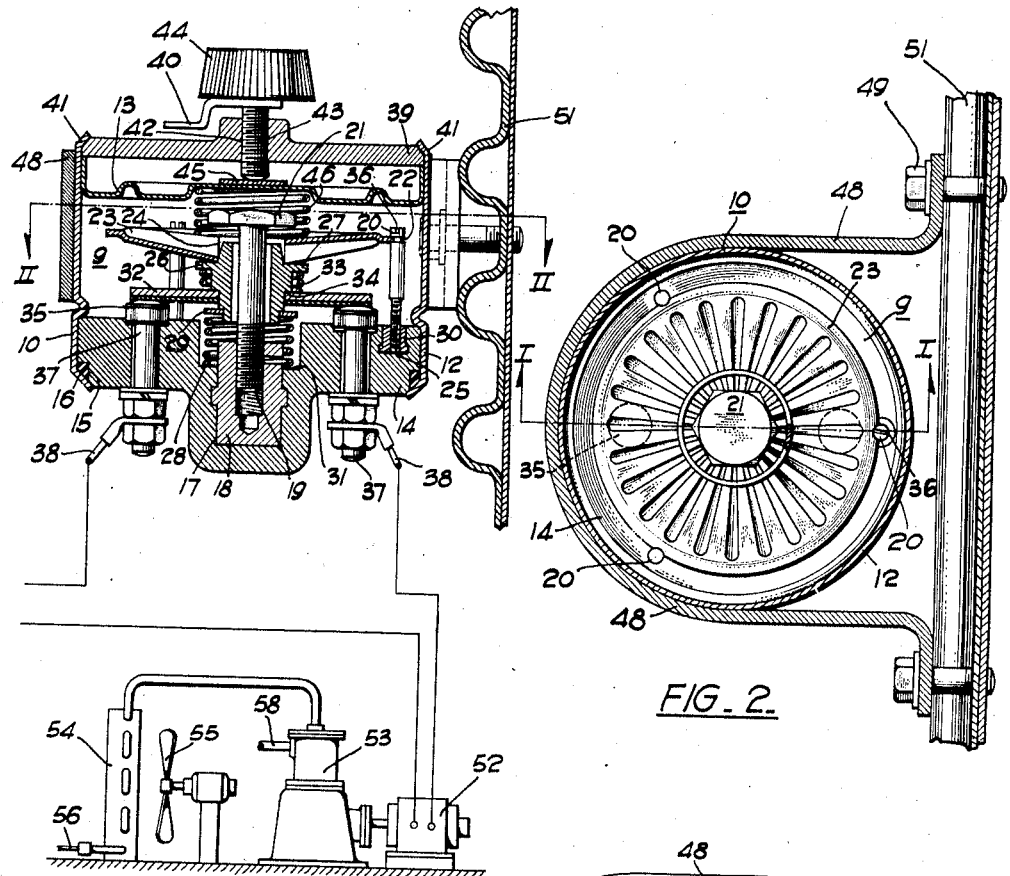
FIG. 1.
FIG. 2.
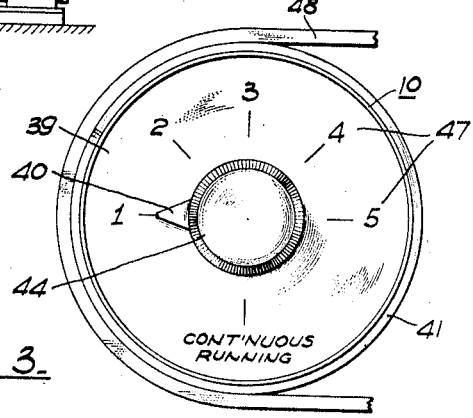
FIG. 3.
WITNESSES:
INVENTOR
GERALD P. MARCY
BY
ATTORNEY Patented Nov. 11, 1941

2,262,027

UNITED STATES PATENT OFFICE 2,262,027

REFRIGERATION APPARATUS

Gerald P. Marcy, Springfield, Mass., assignor to Westinghouse Electric & Manufacturing Company, East Pittsburgh, Pa., a corporation of Pennsylvania Application June 6, 1939, Serial No. 277,598

7 Claims. (Cl. 200—83)

This invention relates to thermostatic control apparatus and more especially to thermostatic control apparatus of the hermetically sealed, adjustable bi-metal type.

One object of the invention is to provide a novel external adjustment for the temperature responsive element of a sealed thermostatic control mechanism.

Another object of the invention is to provide adjustable thermostatic control apparatus which is reliable and durable and which may be disposed in locations where ice and moisture are present.

A further object of the invention is to provide a novel mounting for a snap-acting disc in a thermostatic control mechanism.

These and other objects are effected by my invention as will be apparent from the following description and claims taken in connection with the accompanying drawing forming a part of this application, in which:

Fig. 1 is a sectional view of the improved control apparatus secured to a wall portion of an evaporator, taken on line I—I of Fig. 2 and includes a diagrammatic view of the refrigerant condensing apparatus which it controls;

Fig. 2 is a sectional view of the control mechanism taken on the line II—II of Fig. 1; and, Fig. 3 is a view of a control knob and dial utilized in practicing my invention.

Referring specifically to the drawing for a detailed description of the invention, reference numeral 10 designates a hermetically sealed casing containing a complete temperature responsive control mechanism generally indicated at 9. The casing 10 embodies a hollow metal cylinder 12, a flexible diaphragm 13 comprising a concentrically corrugated metal disc soldered at its edges adjacent to one end of the metal cylinder 12 and a plug 14 of molded insulating material secured in the other end of the cylinder 12.

The plug 14 is provided with an annular notch 15 in which a gasket 16 of a resilient material, such as rubber, is disposed. The plug 14 is inserted in its position in the cylinder 12 and the edges thereof are rolled inwardly to tightly seal the plug in position. The casing 10 may be evacuated or filled with an inert gas to protect the mechanism enclosed therein.

The plug 14 is provided with an opening 17 in which a tapped metal bushing 18 is disposed. A threaded shaft 19 is screwed into the metal bushing 18 and extends outwardly therefrom. A stop 21 in the form of a bolt head is provided on the end of the shaft 19 for a purpose hereafter described. Three equally spaced supporting rods 20 are provided adjacent the periphery of the plug 14. The rods 20 are provided with a peripheral kerf 22 adjacent the upper end for engaging a bi-metallic, snap-acting temperature responsive element 23 preferably disc-shaped as shown in Fig. 2. One of the rods 20 is provided with screw threads 25 which engage the screw threads of a bushing 30 set into the plug. The upper end of the rod is provided with a screw driver slot 36 by means of which the rod may be rotated to change the position of a portion of the disc 23 to thereby adjust the differential between the cut-on and cut-off temperatures of the disc 23.

The disc 23 is provided with an aperture 24 in the center thereof through which the threaded shaft 19 extends. The disc 23 is adapted to snap upwardly from the position shown in Fig. 1 when its temperature decreases to a predetermined point and to snap back to its lower position when its temperature increases by a certain amount above this predetermined point.

A cylindrical insulating member 26 with a central bore is slidably mounted on the shaft 19 and a shoulder 27 on the member 26 is held in engagement with the disc 23 by a coil spring 28. One end of the spring 28 engages a washer 29 on the insulating member 26 and the other end engages a shoulder 31 in the plug 14. A movable contact member 32 is loosely mounted on the insulating member 26 and is in engagement with one end of a coil spring 33. A second shoulder 34 is provided on the insulating member 26 and engages the movable contact member 32 when the disc 23 is in the lower position, as shown in Fig. 1. Two stationary contacts 35 are mounted on the plug member 14. Terminals 37 extend through the plug 14 and are connected to conductors 38.

A disc 39 of molded material is secured across the upper end of the cylinder 12 above the flexible diaphragm 13 by crimping the upper edges 41 of the cylinder 12 over the bearing 39. The disc 39 is provided with a reference dial 47 and a central threaded opening 42 which engages a threaded shaft 43 having a pointer 40 and a control knob 44 on the outer end thereof. The shaft 43 bears against a metal reinforced disc 45 on the diaphragm 13 and is adapted to move the diaphragm 13 to any position within the range of flexibility thereof. A coil spring 46 is interposed between the diaphragm and the bi-metallic disc 23.

The knob 44, diaphragm 13, and spring 46 provide a means for changing the temperature at which the disc 23 opens the contact members 32, 35. If the knob 44 is turned to increase the compression of the spring 46, the contacts 32, 35 will be opened and closed at a lower temperature, respectively, and if the knob 44 is turned to decrease the compression of the spring 46, the temperatures at which the contacts will open or close will be increased. The various degrees of compression of the spring 46 are indicated by the pointer 40 and the indicia on the dial 47. The position on the dial marked "Continuous running" marks the point at which the spring 46 is compressed to the point where the contacts 32, 35 are continuously closed so that the refrigerating machinery runs continuously.

The control apparatus of this invention is preferably applied by means of a strap 48 and bolts 49 to the evaporator 51 of a domestic refrigerating machine. In this machine, a motor 52 drives a compressor 53 to compress refrigerant and condense the same in a condenser 54 cooled by a fan 55. The condensed refrigerant is delivered through a conduit 56 to the evaporator 51, a portion of which is shown in the figures, and any suitable expansion device (not shown) is disposed between the condenser 54 and the evaporator 51. Vaporized refrigerant is returned to the compressor through a conduit 58.

The conductors 38 and the contact elements 32, 35 are placed in series in an electric circuit which supplies energy to the electrical motor 52 so that the contact elements 32, 35 constitute a device which controls the operation of the motor 52. The disc 23, therefore, opens and closes the circuit to the motor 52 in response to the temperature of the evaporator 51 which temperature is conducted to the thermostatic control apparatus through the strap 48. The thermostatic control apparatus is preferably mounted in a horizontal position with the dial 47 facing the door of the refrigerator.

From the above, it will be apparent that this invention provides a thermostatic control apparatus which is adjustable as to its actuating temperature. The working parts of this control are, furthermore, enclosed in a sealed casing which is moisture and frost proof, so that it can be mounted on the evaporator of a refrigerator to control the operation thereof. The invention also provides a novel adjustment for a bi-metallic temperature responsive element in control apparatus of the type disclosed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a temperature responsive control mechanism, the combination of a snap-acting disc, and means for mounting said disc embodying a plurality of members for clamping the periphery of said disc therebetween, one of said members being provided with a circumferential groove engaging the periphery of said disc, a screw threaded on said member coaxial with said groove and a cooperating thread engaging said first-named thread, whereby the position of said disc may be altered by turning said threaded clamping member.

2. In a temperature-responsive control mechanism, the combination of a substantially sealed casing having a substantially flat flexible diaphragm, means for adjusting the position of the flexible diaphragm, electrical contacts enclosed within said casing, a temperature-responsive element also enclosed therein and controlling the opening and closing of said contacts, and an elastic connection disposed between the flexible diaphragm and the temperature-responsive element, whereby the position of the flexible diaphragm controls the temperature at which the temperature-responsive element opens and closes said contacts, the flexible diaphragm and the elastic connection being so proportioned that on at least one position of the flexible diaphragm the contacts remain closed at all temperatures.

3. In a temperature-responsive control mechanism adapted for mounting adjacent an evaporator to control the temperature thereof, the combination of a sealed, moisture-proof casing, a snap-acting temperature-responsive element therein, an electric contact in said casing controlled by said element, said casing having a flexible wall lying in substantially one plane and affording movement of a central area thereof in a direction at right angles to the plane of said wall, a connection between said central area and said temperature-responsive element to vary the temperature response of said element, and means on the exterior of said casing to vary the position of the central area of said wall with respect to the temperature-responsive element.

4. In a temperature-responsive control mechanism adapted for mounting adjacent an evaporator to control the temperature thereof, the combination of a sealed, moisture-proof casing, a snap-acting element in said casing responsive to the temperature therein, an electric contact in said casing controlled by said element, said casing having a flexible wall lying in substantially one plane and affording movement of a central area thereof in a direction at right angles to the plane of said wall, a connection between said central area and said temperature-responsive element to vary the temperature response of said element, and means on the exterior of said casing to vary the position of the central area of said wall with respect to the temperature-responsive element.

5. In a temperature-responsive control mechanism adapted for mounting adjacent an evaporator, the combination of a sealed, moisture-proof casing, a snap-acting element in said casing responsive to the temperature therein, an electric contact in said casing controlled by said element, said casing comprising a disc lying in substantially one plane and provided with at least one circular undulation to afford movement of the central area of said disc in a direction at right angles to the plane thereof, a connection between said central area and said temperature-responsive element adapted to vary the temperature response of said element, and means on the exterior of said casing for varying the position of the central area of said disc with respect to another portion of the walls of said casing to vary the temperature response of said element.

6. In a temperature-responsive control mechanism adapted for mounting adjacent an evaporator to control the temperature thereof, the combination of a sealed, moisture-proof casing, a snap-acting element in said casing responsive to the temperature therein, an electric contact in said casing controlled by said element, said casing having a flexible wall lying in substantially one plane and affording movement of the central area of said wall in a direction at right angles to the plane thereof, a flexible connection between said central area and said temperature-responsive element, and means on the exterior of said casing for varying the position of the central area of said wall with respect to the temperature-responsive element to vary the bias of said flexible connection on said element and thereby the temperature response of the same.

7. In a temperature-responsive control mechanism, the combination of a snap-acting disc and means for mounting said disc, said means including two stationary and one movable support engaging spaced-apart points on the periphery of said disc, said movable support comprising a pin, screw threads on said stationary member engaging the screw threads on said pin, a circular groove on said pin, the axis of said circular groove being concentric with the axis of the screw-threaded portion of said pin, said circular groove engaging one edge of said disc, and means whereby said pin may be rotated, whereby rotation of said pin alters the relative position of said disc with respect to said stationary member.

GERALD F. MARCY.